(12) United States Patent
Preston et al.

(10) Patent No.: US 10,123,088 B2
(45) Date of Patent: Nov. 6, 2018

(54) METHOD AND SYSTEM FOR CHANNEL SEARCHING AND FILTERING

(71) Applicant: TiVo Solutions Inc., San Carlos, CA (US)

(72) Inventors: Jim Preston, Alviso, CA (US); Irvan Krantzler, Alviso, CA (US)

(73) Assignee: TiVo Solutions Inc., San Jose, CA (US)

(*) Notice: Subject to any disclaimer, the term of this patent is extended or adjusted under 35 U.S.C. 154(b) by 0 days.

(21) Appl. No.: 13/651,248

(22) Filed: Oct. 12, 2012

(65) Prior Publication Data

US 2014/0104495 A1    Apr. 17, 2014

(51) Int. Cl.
*H04N 5/445* (2011.01)
*H04N 21/482* (2011.01)
*H04N 21/431* (2011.01)
*H04N 21/433* (2011.01)

(52) U.S. Cl.
CPC ..... *H04N 21/4821* (2013.01); *H04N 21/4826* (2013.01); *H04N 21/4828* (2013.01); *H04N 21/4316* (2013.01); *H04N 21/4331* (2013.01); *H04N 2005/44556* (2013.01); *H04N 2005/44569* (2013.01)

(58) Field of Classification Search
CPC ....... H04N 21/42214; H04N 21/42213; H04N 21/42215; H04N 21/42216; H04N 21/4821; H04N 21/4823; H04N 21/4826; H04N 21/4828; H04N 21/4316; H04N 21/4331; H04N 2005/44556; H04N 21/44569; H03J 9/00

USPC .......... 725/37, 38, 53, 57; 348/734
See application file for complete search history.

(56) References Cited

U.S. PATENT DOCUMENTS

| | | | |
|---|---|---|---|
| 6,141,003 A * | 10/2000 | Chor et al. | 715/719 |
| 6,766,526 B1 * | 7/2004 | Ellis | 725/57 |
| 7,224,409 B2 * | 5/2007 | Chin et al. | 348/732 |
| 8,191,094 B2 * | 5/2012 | Azera et al. | 725/53 |
| 8,225,356 B2 * | 7/2012 | Javvaji et al. | 725/57 |
| 8,490,198 B2 * | 7/2013 | Morris et al. | 726/26 |
| 8,843,958 B2 * | 9/2014 | Kim | H04N 21/4821 348/731 |
| 8,869,210 B2 * | 10/2014 | Shikata | H04N 5/44582 348/734 |
| 8,937,687 B2 * | 1/2015 | Coburn | H03J 1/0025 348/734 |
| 9,332,317 B1 * | 5/2016 | Iten | G06F 17/30846 |

(Continued)

*Primary Examiner* — An Son P Huynh
(74) *Attorney, Agent, or Firm* — Haley Guiliano LLP

(57) ABSTRACT

A multimedia device determines that the user is attempting to tune to a channel. In response to the determination, the multimedia device identifies a list of channels likely to be the channel to which the user is attempting to tune. The multimedia device displays a channel tuning banner that allows the user to select a channel from the list, thereby causing the multimedia device to tune to the selected channel. In another context, users want to locate scheduling information for a particular channel within an electronic program guide (EPG). Thus, a multimedia device receives search criteria from a user and uses the search criteria to dynamically filter the EPG while the user is interacting with the EPG. As a result, the user is presented with a reduced number of EPG entries to look through in order to find relevant information.

30 Claims, 8 Drawing Sheets

(56) References Cited

U.S. PATENT DOCUMENTS

| | | | |
|---|---|---|---|
| 9,473,729 B2* | 10/2016 | Miles | H04N 5/445 |
| 2003/0137605 A1* | 7/2003 | Chin et al. | 348/569 |
| 2005/0155063 A1* | 7/2005 | Bayrakeri et al. | 725/47 |
| 2005/0204387 A1* | 9/2005 | Knudson et al. | 725/52 |
| 2005/0278741 A1* | 12/2005 | Robarts et al. | 725/46 |
| 2006/0174272 A1* | 8/2006 | Kwon | H04N 5/44513 |
| | | | 725/39 |
| 2007/0143790 A1* | 6/2007 | Williams et al. | 725/38 |
| 2007/0157236 A1* | 7/2007 | Kim | 725/38 |
| 2007/0288987 A1* | 12/2007 | Kim et al. | 725/136 |
| 2008/0244643 A1* | 10/2008 | Virzi | H04N 5/4403 |
| | | | 725/37 |
| 2008/0276277 A1* | 11/2008 | Ahn et al. | 725/40 |
| 2009/0284472 A1* | 11/2009 | Mehta et al. | 345/169 |
| 2011/0231878 A1* | 9/2011 | Hunter et al. | 725/48 |
| 2011/0292286 A1* | 12/2011 | Park | H04N 5/4403 |
| | | | 348/569 |
| 2012/0054803 A1* | 3/2012 | Lee et al. | 725/56 |
| 2012/0110621 A1* | 5/2012 | Gossweiler, III | 725/46 |
| 2013/0216208 A1* | 8/2013 | Kummer et al. | 386/292 |

* cited by examiner

METHOD AND SYSTEM FOR CHANNEL SEARCHING AND FILTERING

FIELD OF THE INVENTION

The present invention relates to techniques for channel searching and filtering.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Programs and other content are broadcasted to multimedia devices, such as digital video recorders (DVRs) and other set top boxes, over a multitude of channels. Traditionally, the different channels represented the different frequency bands over which the programs were aired by local television stations. However, with the advent of digital television, televisions stations have largely switched to transmitting content using digitally processed and multiplexed signals, rather than analog signals.

In order for a multimedia device to present content associated with a particular television station, the multimedia device "tunes" to the channel upon which the television station transmits content. Multimedia devices will typically have a hardware or software component, referred to as a "tuner", which performs the task of tuning to particular channels. In the case of analog transmission, the tuner may filter incoming signals to only those signals traveling within the frequency band associated with a particular television station. In the case of digital television, the tuner demultiplexes the digital signal.

In some cases, television stations operate on virtual channels, channels that differ from the actual channel upon which the signal travels. For example, many digital television tuners use a virtual channel map (also referred to as a virtual channel table) to associate virtual channels to actual channels. As a result, users are able to access channels by employing an input device, such as a remote control, to instruct the multimedia device to tune to the channel associated with a particular virtual channel number. The multimedia device then maps the virtual channel number to an actual channel using the virtual channel map. As a result, a television station may be identified within the digital stream using one channel number, but branded for identification by users with a different channel number. For example, a television station identified by users as "Channel 8" may actually use channel 32 for the underlying transmission protocols and formats, such as ATSC, DVB, ISDB, etc.

In some cases, the content presented by each television station adheres to a particular theme or genre. For example, television stations may specialize in programs concerning local news, science fiction, sports, dramas, documentaries, public access, and so on. In other cases, television stations are associated with television networks from which the television station receives content. For example, a single television network may be associated with multiple television stations spread across a large area in order to reach a greater audience. As a result, users tend to associate television stations not just with the channel number used to access the television station's content, but also with the source or type of content that is aired by the television station. Thus, television stations are often branded with a channel name that serves many of the same purposes as a trademark, engraining the television station into the minds of users and in some cases developing user confidence in the content provided by a particular network, even if that content is presented by different television stations. Channel names are often also trademarked by the television stations or television networks to which they belong. Furthermore, television stations that broadcast content over the air are also subject to a federal requirement to identify themselves at periodic intervals. The designation used for this purpose is often referred to as a "call sign". Thus, television stations which have call signs will sometimes use their call sign, or a variation thereof, as their channel name.

When the number of channels available to a multimedia device is relatively small, users tend to be able to remember which channel numbers are associated with the television stations and/or content that they want to view. However, the number of channels available to multimedia devices has increased rapidly over the years, with many multimedia devices presently receiving content over hundreds, if not thousands, of different channels. Consequently, many users find it difficult to remember which channel numbers are associated with the television stations or content that they wish to view. To further exacerbate matters, different television stations transmitting content from the same television network often do not transmit the content using the same channel number. Thus, in one geographic area a particular television network's program lineup may be accessed using one channel number, while in another geographic area the same program lineup may be accessed using a different channel number. As a result, users moving from one geographical area to the other may not be familiar with which channel numbers map to channels playing content from a particular television network. Since users who are not familiar with the channel numbers are unable to tune directly to their desired channel, often times such users will resort to "channel surfing" or tuning from channel to channel searching for their desired content. Channel surfing can be a tedious and time consuming process, especially when the number of channels that the user needs to search through is very large.

To assist users with locating programming to view, many multimedia devices provide an electronic program guide (EPG) that displays menus of scheduling information for broadcast programming. In some cases, EPGs allow users to navigate the scheduling information interactively, selecting and discovering dates and times when programs will be airing over the various channels. In addition, EPGs sometimes offer additional information, such as content ratings, genre, and/or short descriptions of each program. However, as the number of channels available to multimedia devices increases, the number of entries within the EPGs increases accordingly.

DETAILED DESCRIPTION

Figure 1:
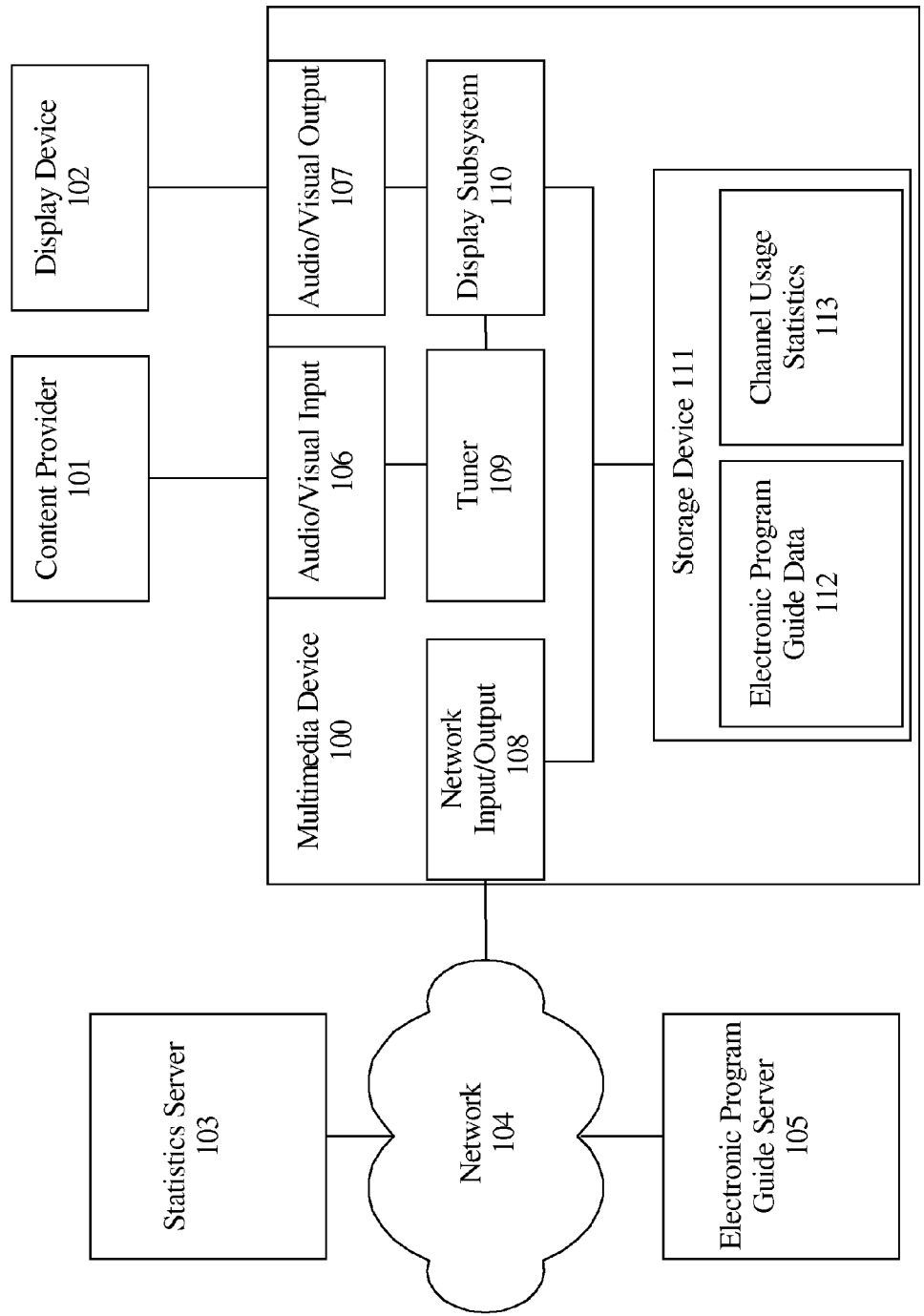
FIG. 1 illustrates an example environment upon which an embodiment of the present invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features can be found according to the following outline:
1.0 General Overview
2.0 Example Environment
3.0 Displaying the Electronic Program Guide
4.0 Filtering the Electronic Program Guide
5.0 Channel Tuning Banner
6.0 Channel Tuning Selection
7.0 Custom Shortcuts
8.0 Remote Control Input Techniques
9.0 Hardware Overview 1.0 General Overview Users often find it difficult to locate channels for purposes such as tuning and obtaining scheduling information, especially when the number of channels available to the user's multimedia device becomes very large. Thus, search techniques for locating channels in various contexts are described herein.

In one context, a user may want to tune to a particular channel. In some cases, tuning can be accomplished by the user submitting the channel number corresponding to the particular channel. However, when the multimedia device has access to hundreds or even thousands of channels, the user may have difficulty recalling the correct channel number. Still, even if the user cannot remember the correct channel number, the user may remember other features of the channel, such as the channel's name or call sign. Thus, in an embodiment, the multimedia device allows the user to choose which feature will be used for tuning. As the user enters the feature, the multimedia device identifies a list of channels that the user is likely to be searching for based on the current input. The multimedia device then displays a channel tuning banner that allows the user to select a channel from the list, thereby causing the multimedia device to tune to the selected channel.

In an embodiment, a multimedia device receives one or more characters representing at least part of a channel identifier. For example, channel identifiers may include, channel name, channel number, and call sign. In response, the multimedia device identifies one or more channels that have a corresponding channel identifier containing a substring that matches the one or more characters. The multimedia device then displays at least a portion of the one or more channels to the user. For example, the one or more channels may be presented in a scrollable list that displays only a particular number of the one or more channels at a time. In response to determining that a particular channel from the list has been selected, the multimedia device tunes to the selected channel.

In another context, users may want to locate scheduling information for a particular channel in an EPG. However, when the user's multimedia device has access to a large number of channels; the EPG contains a correspondingly large number of entries. Thus, the user may be forced into the time-consuming task of manually scrolling through the EPG to find relevant information. Thus, in an embodiment, a multimedia device provides a mechanism that allows users to specify search criteria that is used to filter the EPG data. As a result, the user is presented with a reduced number of EPG entries to look through in order to find information for the particular channel.

In an embodiment, a multimedia device displays a first page of an EPG. The EPG contains channel information for a plurality of channels and the first page displays the channel information for a subset of the plurality of channels. In response to receiving user input specifying one or more characters, the multimedia device identifies one or more channels within the EPG that are associated with a channel identifier that contains a substring matching the one or more characters. The multimedia device displays a second page of the EPG, the second page displaying channel information for a subset of the one or more channels.

Other possible embodiments include a non-transitory computer readable medium that includes processor-executable instructions that enable a processing unit to implement one or more aspects of the disclosed methods as well as a system or apparatus configured to implement one or more aspects of the disclosed methods.

2.0 Example Environment

FIG. 1 illustrates an example environment upon which an embodiment of the present invention may be implemented.

FIG. 1 shows a multimedia device 100, a content provider 101, a display device 102, a statistics server 103, a network 104, and an EPG server 105. The multimedia device 100 includes any of: an audio/visual input 106, an audio/visual output 107, a network input/output 108, a tuner 109, a display subsystem 110, and a storage device 111. The storage device 111 stores EPG data 112 and channel usage statistics 113. The EPG data 112 may be stored in storage device 111 in any form, e.g., database, linked list, flat file, or any type of data structure. Each of these components are presented to clarify the functionalities described herein and may not be necessary to implement the invention. Furthermore, components not shown in FIG. 1 may also be used to perform the functionalities described herein. In addition, functionalities described as performed by one component may also be performed by a different component. Also, although only one of each element is depicted within the embodiment of FIG. 1, a practical environment may have many more, perhaps even hundreds or thousands, of each of the elements depicted within FIG. 1.

In an embodiment, multimedia device 100 represents any device capable of processing or presenting multimedia content. For example, multimedia device 100 may represent a set top box, such as a DVR, thin client, etc.

In an embodiment, audio/visual input 106 is any component that allows receipt of content from content provider 101. For example, audio/visual input 106 may represent a cable receiver, a radio receiver, or a satellite dish.

In an embodiment, content provider 101 represents any source from which multimedia device 100 may derive content. For example, content provider 101 may represent a local broadcaster that streams media content to multimedia device 100 over one or more channels or over the Internet. In one embodiment, content provider 101 transmits content over one or more analog frequencies. However, in another embodiment, content provider 101 transmits content in the form of a digital stream, using encodings such as MPEG-2, MPEG-4, etc.

In an embodiment, tuner 109 is any hardware or software component that allows multimedia device 100 to select content streamed by content provider 101 over a particular channel. In one embodiment, tuner 109 changes to a particular channel by tuning to an analog frequency associated with the particular channel. In another embodiment, tuner 109 changes to a particular channel by demultiplexing a digital stream provided by content provider 101. For example, the digital stream may be multiplexed using techniques such as statistical multiplexing, code division multiplexing, time division multiplex, or any other multiplexing techniques. Thus, depending on the embodiment, tuner 109 may rely upon tags, codes, time markers, or other features of the digital stream to select content associated with a particular channel. In an embodiment, after tuner 109 selects content from a particular channel, the tuner 109 provides the content to display subsystem 110.

In an embodiment, display subsystem 110 represents any combination of one or more hardware or software components that processes and transfers content to display device 102 through audio/visual output 107. In some embodiments, display subsystem 110 is capable of modifying the content provided by tuner 109 before transferring the content to display device 102. For example, display subsystem 110 may insert notifications, logos, advertisements, menu overlays, and other graphical elements into the content provided by tuner 109. In other embodiments, the graphical elements may be displayed instead of the content provided from tuner 109. For example, during a pause for a commercial break or to display a menu that covers the entire display of display device 102, as opposed to being overlaid over the content. In still other embodiments, the content from tuner 109 may be minimized to cover only part of the display of display device 102 with graphical elements inserted into the resulting free space. In an embodiment, the graphical elements used by display subsystem 110 are stored on storage device 111. However, in other embodiments, display subsystem 110 generates the graphical elements from data stored on storage device 111. In an embodiment, display subsystem 110 is the component of multimedia device 100 responsible for providing a view of the EPG data 112 to display device 102 for presentation to a user. In an embodiment, display subsystem 110 sorts through the EPG data 110 and constructs a user interface (UI) which is then provided to display device 102.

In an embodiment, audio/visual output 107 is any component that allows transfer of audio/visual data to display device 102. For example, audio/visual output 107 may represent an RCA connector, DVI, FireWire, Fiber-Optic, HDMI, DisplayPort, etc.

In an embodiment, storage device 111 is any device capable of storing data. For example, storage device 111 may represent a hard drive disk, solid state drive (SSD), random access memory (RAM), a flash drive, other storage devices, and combinations thereof.

In an embodiment, display device 102 is any device capable of displaying multimedia content. For example, display device 102 may be a television set, monitor, etc.

In an embodiment, network 104 represents any combination of one or more local networks, wide area networks, internetworks, service provider networks, etc. Data exchanged over network 104, may be transferred using any number of network layer protocols, such as Internet Protocol (TCP/IP), Multiprotocol Label Switching (MPLS), Asynchronous Transfer Mode (ATM), Frame Relay, etc. Furthermore, in embodiments where network 104 represents a combination of multiple networks, different network layer protocols may be used at each of the underlying networks. In some embodiments, network 104 represents the Internet.

In an embodiment, multimedia device 100 connects to network 104 through network input/output 108. For example, network input/output 108 may include a direct Ethernet connection, a Universal Serial Bus (USB) port for a wired or wireless Ethernet adapter, etc.

In an embodiment, EPG server 105 represents any server capable of providing EPG information to multimedia device 100. In an embodiment, EPG server 105 periodically sends updates to multimedia device 100 for incorporation into EPG data 112. For example, EPG server 105 may, at end of each week, send multimedia device 100 scheduling information related to the programs that will be aired during the next week or, optionally, send multimedia device 100 a notification that an EPG update is available. In an embodiment, incorporation includes updating EPG data 112 with new information or replacing EPG data 112 with new data received from EPG server 105. In other embodiments, rather than EPG server 105 initiating periodic updates, multimedia device 100 periodically requests updates from the EPG server 105.

In some embodiments, multimedia device 100, when receiving an update or independently of the reception of an update from EPG server 105, retrieves advertisements or instructions to play advertisements in association with particular channels or programs. These advertisements, in some embodiments, may be placed by display subsystem 110 into menus associated with those channels or programs. In other embodiments, the advertisements may be added to the content provided by tuner 109 when multimedia device 100 presents the associated channel or program.

In an embodiment, EPG data 112 contains metadata representing channel information. For example, the metadata for each channel may include a channel number, a channel name, a call sign, and a timeline of when programs air on the channel. Furthermore, EPG data 112 may contain metadata specific to particular programs, such as program title, content rating, actors, synopsis, producer, director, episode number (for programs that are episodic), reviews, etc.

In an embodiment, statistics server 103 is any server storing statistics related to channel usage. For example, statistics server 103 may store the frequency with which particular channels are accessed within various geographical areas or demographics. In order to compile these statistics, statistics server 103 may periodically poll for, or receive from, multimedia device 100, or other multimedia devices not depicted in FIG. 1, statistics related to how often particular channels are accessed by the users of each respective multimedia device. Thus, in an embodiment, when a user selects a channel, multimedia device 100 indicates the selection within channel usage statistics 113. Examples of information that may be stored within channel usage statistics 113 include channel number, channel name, call sign, the program playing at the time of selection, user profile data, the length of time the channel or program was viewed, timestamp, etc. In some embodiments, the information contained within channel usage statistics 113 may be anonymized before or after being transferred to statistics server 103 in order to protect user privacy. In an alternative embodiment, rather than statistics server 103 performing polling, each respective multimedia device may periodically report out collected statistics to statistics server 103.

In an embodiment, once statistics server 103 receives channel usage data from one or more multimedia devices, statistics server 103 analyzes the data for trends such as popular channels within geographical areas, demographics, or other any other type of grouping criteria. Statistics server 103 can then make the statistics related to the aforementioned trends available to multimedia device 100. Thus, multimedia device 100 may retrieve the trend statistics from statistics server 103 and store them within channel usage statistics 113 along with any independently collected statistics. For example, the statistics retrieved from statistics server 103 may relate to general groups of users whereas the statistics collected locally may relate to the specific users of multimedia device 100. In one embodiment, multimedia device 100 employs channel usage statistics 113 to determine which graphical elements (e.g. advertisements, etc.) should be displayed to a user. Furthermore, as will be described in more detail in later sections, multimedia device 100 in some embodiments uses channel usage statistics 113 to determine the order to present channels in various menus related to channel tuning and the display of EPG data 112.

3.0 Displaying the Electronic Program Guide

In an embodiment, multimedia device 100 displays a user interface (UI) presenting at least a portion of the EPG data 112 in response to receiving user input. For example, the user may utilize a remote that has a "guide" button that can be used to instruct the multimedia device 100 to display the EPG data 112 UI. As another example, the multimedia device 100 may present a menu with an option for displaying the EPG data 112 UI. In other embodiments, the multimedia device 100 displays the EPG data 112 UI automatically. For example, multimedia device 100 may display the EPG data 112 UI in response to the multimedia device 100 or the display device 102 being activated by a user. As a result, when a user begins a session of watching programs using multimedia device 100, the user is initially presented with EPG data 112 UI.

In some cases, EPG data 112 may contain information for a large number of channels, potentially hundreds or even thousands of channels. As a result, display device 102 may not be able to display all the information contained within EPG data 112 simultaneously without significantly impacting the readability of the information. Thus, according to an embodiment, the information contained within EPG data 112 is displayed in pages, each of which contains information for a subset of the channels represented within EPG data 112. In addition, pages may further save space on the display of display device 102 by including only a subset of the information available for each channel.

Figure 2:
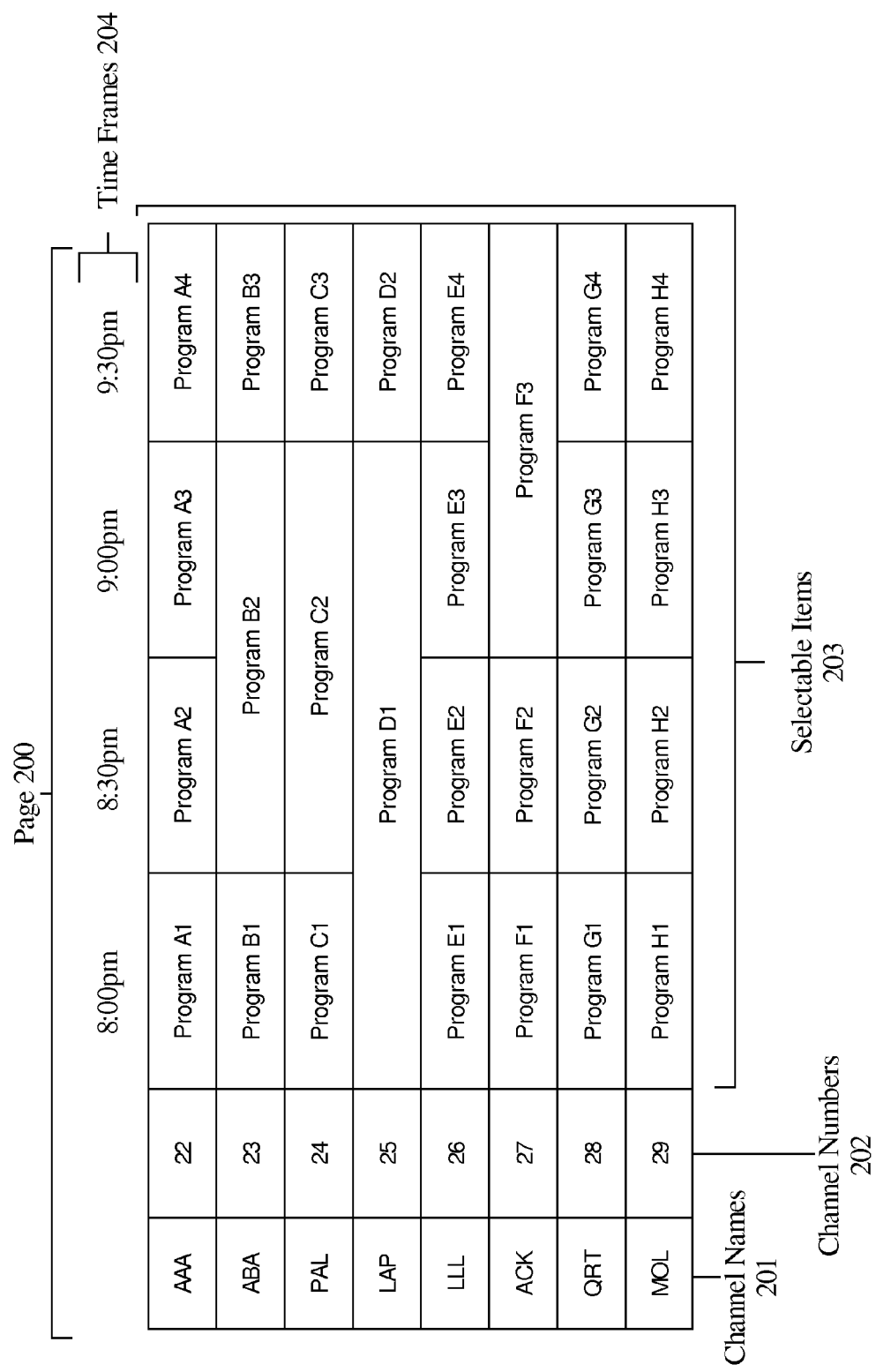
FIG. 2 illustrates an example page of a user interface (UI) screen for EPG data according to an embodiment.

FIG. 2 illustrates an example page 200 of a UI for EPG data 112 according to an embodiment.

Page 200 is depicted within FIG. 2 in tabular format, with the rows representing each channel and the columns representing one or more informational elements for each channel. However, in other embodiments, page 200 may be displayed in formats other than a table.

The informational elements contained by page 200 include channel names 201, channel numbers 202, and one or more selectable items 203 representing the programs A1-H4 that have aired, are airing, or will be aired on each channel during time frames 204. Although each of the time frames 204, depicted in FIG. 2 represent a half hour interval, in other embodiments the time frames 204 may represent any other arbitrary interval or any combination of arbitrary intervals. For example, program A1 is depicted as airing on channel AAA at 8:00 PM. In other embodiments, the order and content of the informational elements may differ from the depiction of page 200.

In an embodiment, selectable items 203 display information for each of programs A1-H4 including program name, genre, content rating, and/or a short description of the program. Furthermore, users may select one of the selectable items to display additional information from EPG data 112 related to the corresponding program. For example, the additional information may include a more complete description of the program, the director of the program, the main actors of the program, a synopsis of the episode (should the program be episodic), production date, reviews of the program, etc. Furthermore, in the case where multimedia device 100 is a DVR or otherwise has the ability to record programs, the user may be presented with an option to schedule the program for recording. In other embodiments, the information displayed by each selectable item and/or displayed in response to selecting a selectable item may differ from the aforementioned examples.

In an embodiment, users are able to select a selectable item using a "pointer" oriented input device, such as a mouse or motion sensing controller Thus, the user orients the pointer over the desired selectable item and "clicks" to select the selectable item. In other embodiments, users select a selectable item using an input device with directional buttons, such as a remote control. Thus, multimedia device 100 navigates the user to an initial selectable item, which may be highlighted or otherwise visually distinguished from the other selectable items displayed on page 200. Then, utilizing the directional buttons, the user can navigate to adjacent selectable items, with the multimedia device 100 maintaining the highlighting over the selectable item to which the user is currently navigated. Once the user has navigated to a desired selectable item, the user can indicate selection by, for example, pressing a "select" button on the input device.

In an embodiment, multimedia device 100 allows the user to "scroll" through the channels represented within the EPG data 112. In one embodiment, the EPG data 112 may list the channels in a particular order, such as ascending or descending order by channel number. Initially, page 200 displays information for a particular number of channels corresponding to a segment of the list. The segment may be the top of the list, the bottom of the list, or an intermediate portion of the list. When the user attempts to navigate beyond the top-most or bottom-most boundary of page 200, multimedia device 100 shifts the segment further up or further down the list respectively (with or without wrap-around) to change the channels that are being displayed. For example, page 200 is depicted as containing information for channels 22-29. Should the user attempt to navigate upwards from the row representing channel "22", page 200 may be updated to display information for channels 21-28. Similarly, should the user attempt to navigate downwards from the row representing channel "29", page 200 may be updated to display information for channels 23-30. In other embodiments, multimedia device 100 may allow the user to "page up" or "page down", shifting the segment further up or down the list by more than one channel. In an embodiment, the number of channels shifted is based on the number of channels displayed on page 200. For example, in response to receiving user input to "page up" from page 200, page 200 may be updated to display information for channels 14-21.

In an embodiment, multimedia device 100 allows the user to "scroll" through the informational items available for each channel. In one embodiment, when the user attempts to navigate further to the right than the right-most boundary of the selectable items 203 on page 200, multimedia device 100 updates page 200 to advance the time frames that are currently being displayed. For example, should the user attempt to navigate further right from the column representing 9:30 pm, page 200 may be updated to display the programs playing from 8:30-10:30 PM. Similarly, when the user attempts to navigate further to the left than the left-most boundary of the selectable items on 203 on page 200, multimedia device 100 updates page 200 to display programs playing during a previous time frame. For example, should the user attempt to navigate further left from the column representing 8:00, page 200 may be updated to display the programs playing from 7:30-9:30 PM.

In some embodiments, multimedia device 100 tunes to a channel displayed on page 200. In one embodiment, multimedia device 100, in response to receiving user input instructing to tune to a channel, tunes to the channel associated with the row to which the user is currently navigated. For example, if a user is navigated to "Program F1" at the time user input is received, multimedia device 100 tunes to channel 58. In another embodiment, multimedia device 100 displays a menu option when one of the selectable items 403 is selected which gives the user the option to tune to the channel associated with that selectable item. In yet another embodiment, page 200 includes a selectable item that, when selected by the user, causes the multimedia device 100 to tune to the associated channel.

Figure 3:
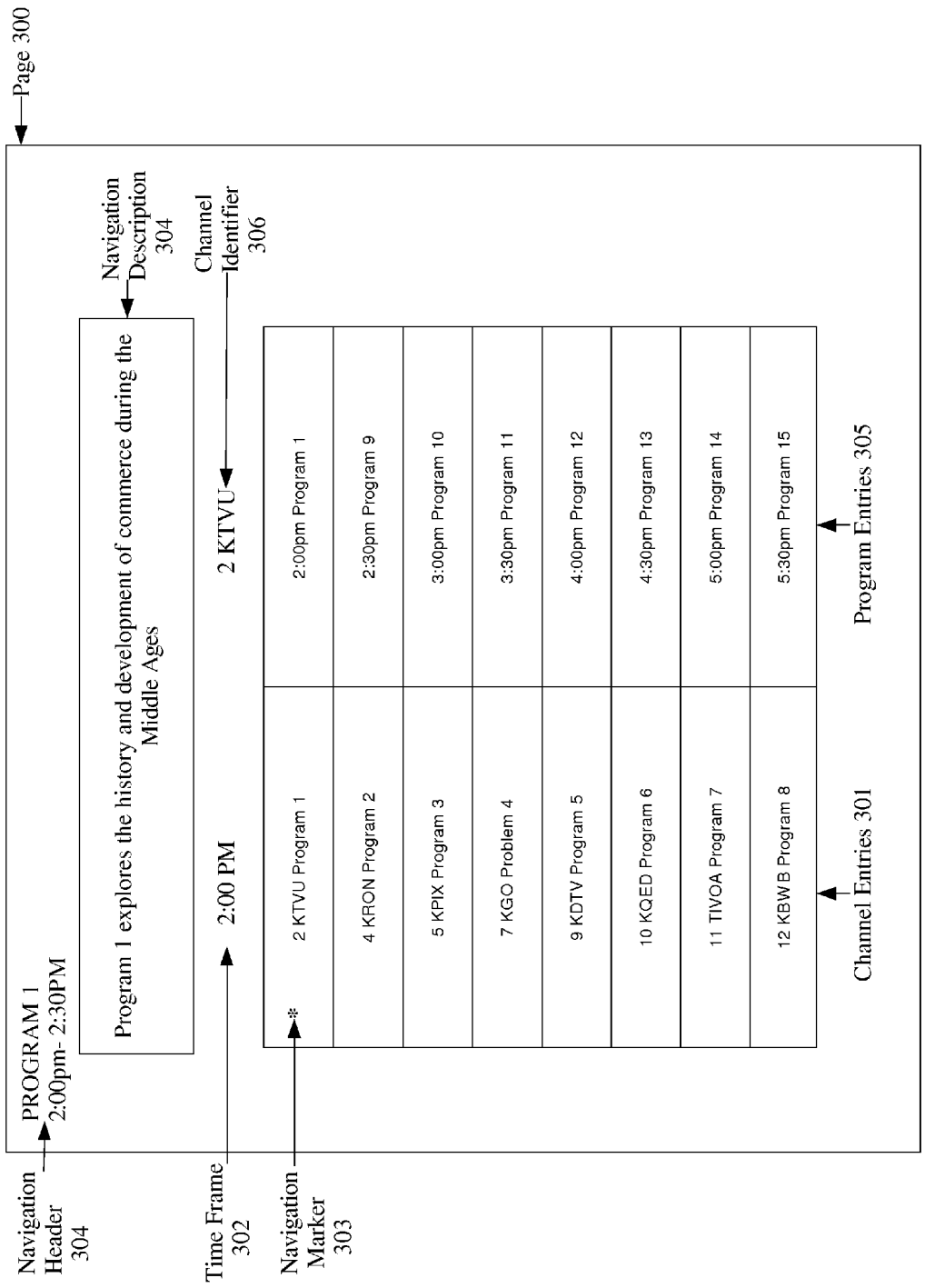
FIG. 3 illustrates an alternative example page of a UI screen for EPG data according to an embodiment.

FIG. 3 illustrates an alternative display for a page 300 of the EPG data 112 UI according to an embodiment. In FIG. 3, channel entries 301 represent a list of programs airing on a subset of the channels during timeframe 302. Each channel entry of channel entries 301 is associated with a particular channel, a particular program, and/or a particular time and displays information including any of channel number, channel name, call sign, program name, time frame, etc. Similar to page 200 of FIG. 2, the channel entries 301 can be scrolled by multimedia device 100 in response to receiving user input navigating through the channel entries 301. In addition, multimedia device 100 visually distinguishes the channel entry to which the user is currently navigated with navigation marker 303. In other embodiments, rather than using navigation marker 303, multimedia device 100 may visually distinguish the channel entry to which the user is currently navigated using other techniques, such as highlighting the channel entry, displaying the channel entry in a different font, adjusting the channel entry's size, etc.

Navigation header 304 displays information for the program associated with the channel entry to which the user is currently navigated. For example, navigation header 304 may display the program's name and the time frame during which the program airs. In addition, program description 304 contains a short description of the program. When the user is navigated to a particular channel entry, multimedia device 100 displays a list of program entries 305, representing programs airing on the associated channel during previous, current, and/or future time frames. In some embodiments, program entries 305 display the same types of information as channel entries 301. However, in other embodiments, program entries 305 display different types of information than channel entries 301. For example, in the embodiment of FIG. 3, each program entry displays a program name and a time during which the program airs whereas each channel entry displays a program name, channel name, and channel number. In the illustration of FIG. 3, the user is currently navigated to the channel entry associated with "Program 1" airing on channel "KTVU" at 2:00 pm. Thus, program entries 305 contain one or more entries representing the programs associated with channel "KTVU" that are viewable in whole or in part during the period 2:00 pm-5:30 pm. In an embodiment, multimedia device 100, in response to user input, scrolls through program entries 305 and displays additional program entries representing previous or subsequent timeframes beyond those currently displayed.

In an embodiment, multimedia device 100 determines whether the user is scrolling through channel entries 301 or program entries 305 based on operating mode. For example, multimedia device 100 may begin by default in an operating mode that assumes input indicating to scroll should be interpreted as scrolling through channel entries 301. However, should multimedia device 100 receive a particular type of input, multimedia device 100 changes to an operating mode that interprets future input indicating to scroll as scrolling through program entries 305. Similarly, in response to receiving another type of input, multimedia device 100 returns to the original operating mode. For example, assuming a directional input device, a user may scroll by submitting input indicating "up" or "down". Thus, initially, "up" and "down" are interpreted as scrolling through channel entries 301. In response to receiving input indicating "right" multimedia device 100 changes to an operational mode that interprets future "up" and "down" input as scrolling through program entries 305. Then, in response to receiving input indicating "left", multimedia device 100 returns to the original operating mode and interprets future "up" and "down" input as scrolling through channel entries 301. In other embodiments, the scrolling input and the input that causes multimedia device 100 to change modes may differ from the above example. Furthermore, in some embodiments, the same type of input may be used to switch between operational modes, as opposed to different inputs being used to switch back and forth as described in the example above.

In an embodiment, in response to user input selecting an entry from channel entries 301 or program entries 305, multimedia device 100 displays additional information related to the selected entry. For example, the additional information may include a more detailed description of the associated program, content ratings, actors, directors, producers, reviews, and/or options to view the associated program or schedule the associated program for recording.

In an embodiment, multimedia device 100 displays the EPG data 112 UI in accordance with the techniques described in U.S. Pat. No. 6,642,939, "Multimedia Schedule Presentation System", owned by the Applicants, the entire contents of which is incorporated by reference for all purposes as though fully stated herein.

Although the following descriptions and examples will be described primarily in reference to the page format illustrated in FIG. 2, the same techniques may be applied in other embodiments to different page formats, such as the page format illustrated in FIG. 3, the UI described in "Multimedia Schedule Presentation System", etc.

4.0 Filtering the Display of an Electronic Program Guide

Although, in some embodiments, multimedia device 100 provides a mechanism for users to scroll through the channels represented within the EPG data 112, locating information for a particular channel may still be a very time consuming process. Even when the user knows the channel number for the channel that they are seeking, the user may still be forced to scroll through numerous entries in order to locate information for the corresponding channel. However, should the user not be familiar with the channel number, the user may potentially have to inspect every entry in the EPG data 112 in order to avoid accidently skipping over relevant information. In order to speed up the user's search, multimedia device 100, in some embodiments, allows the user to filter which channels of the EPG data 112 will be displayed and available for scrolling. Thus, the channels that are displayed to the user can be limited to channels matching particular search criteria.

The filtering techniques that will be described hereafter can be based on any number of criteria associated with the channel including, but not limited to, channel number, channel name, call sign, programs playing on the channel, etc. However, in order to provide clear examples, the following techniques will be described in reference to filtering based on channel name. As mentioned above, the channel numbers used by the various television stations airing a particular television network's content or program lineup may not be synchronized. However, television stations and network providers often work together to ensure that the channel name is branded and advertised in a fairly consistent fashion. Consequently, channel names tend to both remain constant across different television stations and, due to advertising efforts, are generally easier for users to recall. However, for users that are familiar with the channel number, an embodiment that filters by channel number also allows the user to quickly access relevant scheduling information within the EPG data 112. In an embodiment, multimedia device 100 presents a menu option that allows users to set which criteria will be used for filtering. In another embodiment, multimedia device 100 determines which criteria will be used for filtering based on user input. For example, user input that starts with a number may be interpreted as filtering by channel number, whereas user input that starts with a letter may be interpreted as filtering by channel name.

Figure 4:
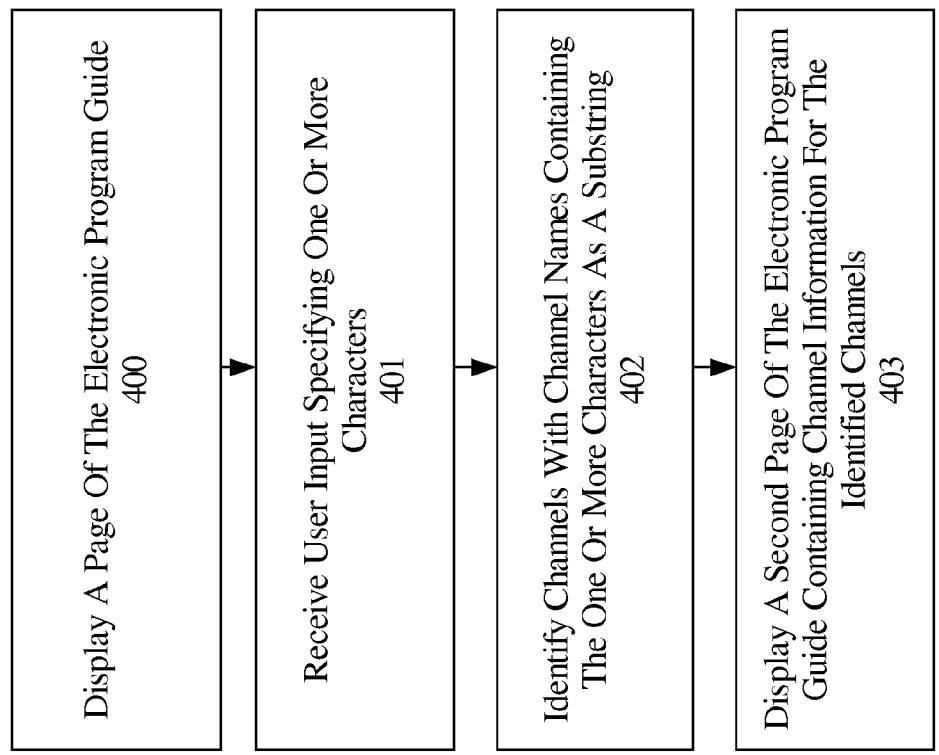
FIG. 4 illustrates a method of filtering EPG data in block diagram form, according to an embodiment.

FIG. 4 illustrates a method for filtering an EPG in block diagram form, according to an embodiment. In order to illustrate clear examples, it will be assumed that multimedia device 100 filters EPG data 112.

At block 400, multimedia device 100 displays page 200 of EPG data 112. In an embodiment, multimedia device 100 displays page 200 according to any of the techniques discussed above in the section "DISPLAYING THE ELECTRONIC PROGRAM GUIDE".

At block 401, multimedia device 100 receives user input specifying one or more characters. In an embodiment, the characters received by the user are alpha-numeric characters. However, other embodiments may allow the user to input symbols such as commas, hyphens, and other punctuation marks. In an embodiment, multimedia device 100 receives user input from a remote control. However, other input devices may also be employed including keyboard, number pad, or any other device capable of submitting characters to multimedia device 100.

At block 402, multimedia device 100 identifies the channels of the EPG data 112 that are associated with channel names containing the one or more characters received at block 401 as a substring. In some embodiments, the multimedia device 100 identifies channels associated with channel names containing the one or more characters as a particular type of substring, e.g., a prefix, postfix, infix, etc. In an embodiment, the multimedia device 100 allows users to change a system setting that controls the type of substring used to identify channels at block 402. In another embodiment, the multimedia device 100 may be configured by the factory that manufactured the multimedia device 100 or by the provider of the multimedia device 100 to perform one, some, or all types of substring matching. In an embodiment, a substring includes one of more characters that match the channel name exactly or partially. In an embodiment, multimedia device 100 scans the EPG data 112 and constructs a list of all the channels whose channel name contains the one or more characters as a substring. The list may maintain the channels in the same order as the channels appear in the EPG data 112, or the list may be reordered by multimedia device 100. For example, the EPG data 112 may order channels by channel number whereas the list of filtered channels orders the channels by channel name. Although a list is used as an example structure, other data structures may also be used to track which channels have names containing the one or more characters as a substring. For example, instead of constructing a list of channels, multimedia device 100 may associate the channels represented within the EPG data 112 with a mark or flag indicating whether or not the channel is to be displayed after filtering.

In an embodiment, multimedia device 100 conducts the scan in piecemeal fashion. For example, multimedia device 100 may scan through the channels located within the EPG data 112 adding channels whose calls signs contain a matching substring until a maximum number of channels that can be displayed on page 200 is reached. The multimedia device 100 upon reaching the maximum number of displayable channels or exhausting the channels contained within the EPG data 112 keeps track of the progress made through the EPG data 112. Then, when the user attempts to scroll page 200 after the initial filtering, multimedia device 100 continues the scan from that point in order to update page 200.

At block 403, multimedia device 100 updates page 200 to display information for one or more of the channels identified at block 402. In an embodiment, multimedia device 100 displays page 200 using the same techniques discussed above in "DISPLAYING THE ELECTRONIC PROGRAM GUIDE", but instead constructs and/or updates page 200 using the list of channels identified at block 402 instead of all the channels contained within EPG data 112. Thus, after filtering, page 200 initially displays information for channels matching the search criteria. Furthermore, in an embodiment, when a user attempts to scroll page 200, the scrolling updates page 200 from the list of channels identified at block 402. As a result, the information presented to the user on page 200 is limited to channels matching the search criteria.

Figure 5:
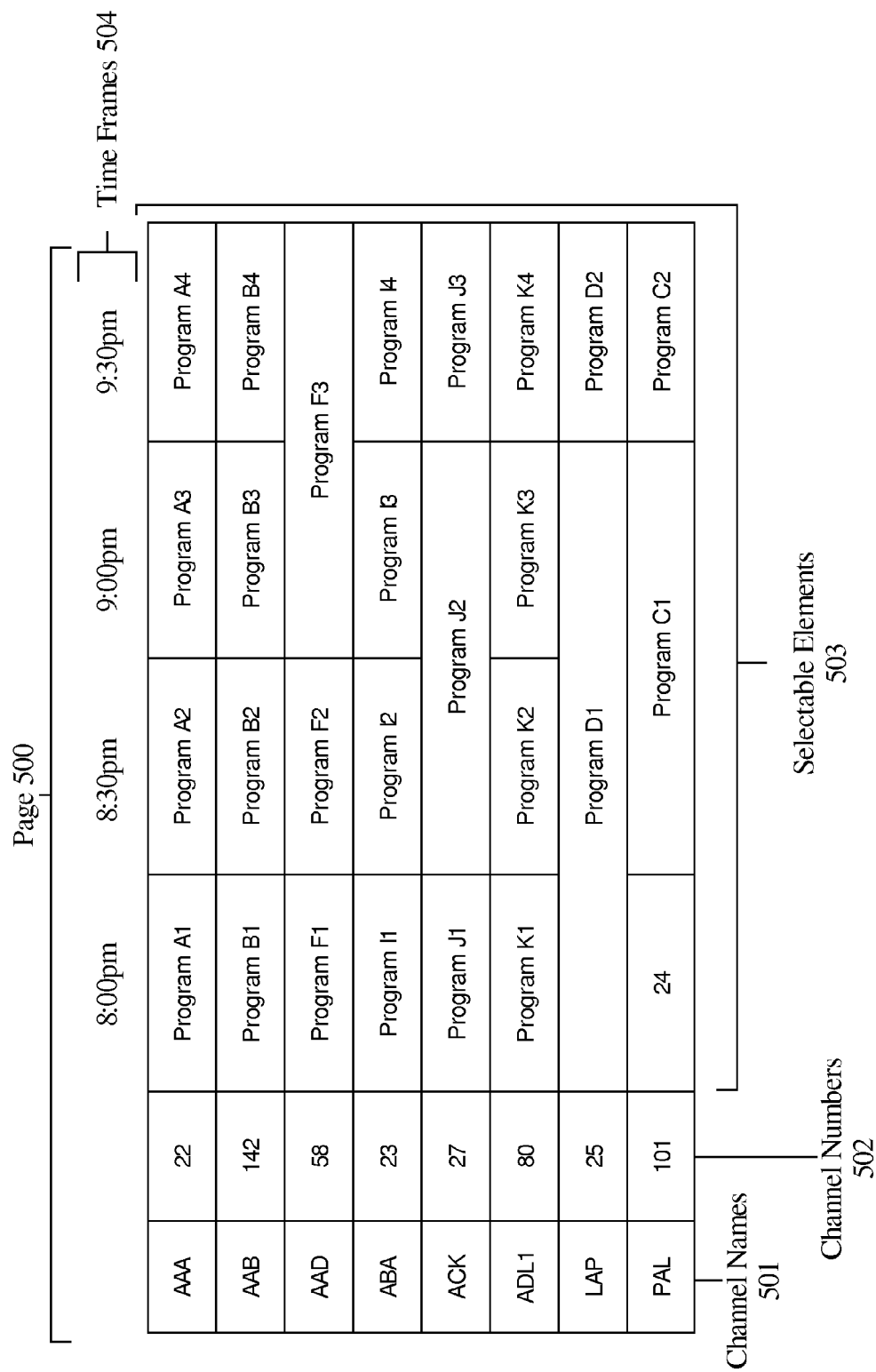
FIG. 5 illustrates the example page of FIG. 2 after the EPG data has been filtered according to an embodiment.

FIG. 5 illustrates page 500, which is provided as an example of how page 200 may appear after a user has entered the character 'A'. Similar to page 200, page 500 displays information including channel names 501, channel numbers 502, selectable elements 503, and time frames 505. However, page 500 is limited to only channels whose channel names 501 contain the substring 'A'. In addition, the channels depicted by FIG. 5 have been reordered based on the feature used for the search criteria (e.g., channel names 501).

In an embodiment, blocks 401, 402, and 403 may be repeated multiple times as multimedia device 100 receives additional user input. In one embodiment, each filtering is performed independently. For example, a user may first submit 'A', causing multimedia device 100 to filter EPG data 112 to channels whose channel name contains the substring 'A'. After receiving a second user input submitting, for example, "B", multimedia device 100 resets the previous filtering and instead filters EPG data 112 based on the substring 'B'. However, in other embodiments, filtering is performed as an iterative process. Thus, after the initial filtering, the filtered list of channels is filtered again based on the concatenation of the first and second user inputs, the substring 'AB'. In one embodiment, the additional filtering is performed by scanning the list identified at block 402 and retaining only channels with channel names that contain the concatenation as a substring. However, other embodiments may repeat the identification process by rescanning EPG data 112 using the concatenation. The additional filtering can be repeated any number of times as more user inputs are received by the multimedia device 100 by concatenating new user inputs onto the current substring and identifying channels based on the concatenation.

In another embodiment, multimedia device 100 resets the filtering in response to user input. For example, multimedia device 100 may provide a menu option that, when selected by a user, causes multimedia device 100 to revert to displaying an unfiltered EPG data 112. In other embodiments, multimedia device 100 in response to user input, deletes or modifies the one of more of the characters used for filtering. As a result, multimedia device 100 refilters EPG data 112 using the modified characters.

In an embodiment, multimedia device 100 displays the one or more characters currently used to filter the EPG data 112. Thus, as characters are submitted, deleted, or modified multimedia device 100 updates the display to remain in sync with the characters used to filter the EPG data 112.

In an embodiment, if at block 402 multimedia device 100 determines that no channels matching the one or more characters have been found, multimedia device 100 displays a notification. As one example, an error box or message may be displayed. As another example, multimedia device 100 may cause the screen to shake. As yet another example, multimedia device 100 may present the notification audibly. In some embodiments, multimedia device 100 maintains the current filtering, allowing the user to try submitting different characters. In other embodiments, multimedia device 100 clears the current filtering criteria, potentially with a visible/audible notification as described above. In another embodiment, multimedia device 100 employs techniques to automatically predict the channels to which the user had intended to filter. As one example, multimedia device 100 may employ spelling detection and correction techniques, such as approximate string matching, by using the channel names contained within EPG data 112 as the dictionary. As another example, multimedia device 100 may consult channel usage statistics 113 to locate commonly accessed channels and perform approximate string or other comparison techniques between the submitted characters and the names of the commonly accessed channels. As a result, multimedia device 100 displays the top N closest matching channels or channels that are within a threshold distance of the submitted characters.

5.0 Displaying the Channel Tuning Banner

In an embodiment, multimedia device 100 detects when a user is attempting to tune to a channel (e.g., by receiving an indication of a button pressed/selected on a remote control device, voice detection, motion detection, etc.) and displays a banner containing information that assists the user throughout the tuning process. However, in some embodiments, users of multimedia device 100 may use the channel tuning banner to retrieve information and not necessarily only for the purpose of tuning.

Figure 6:
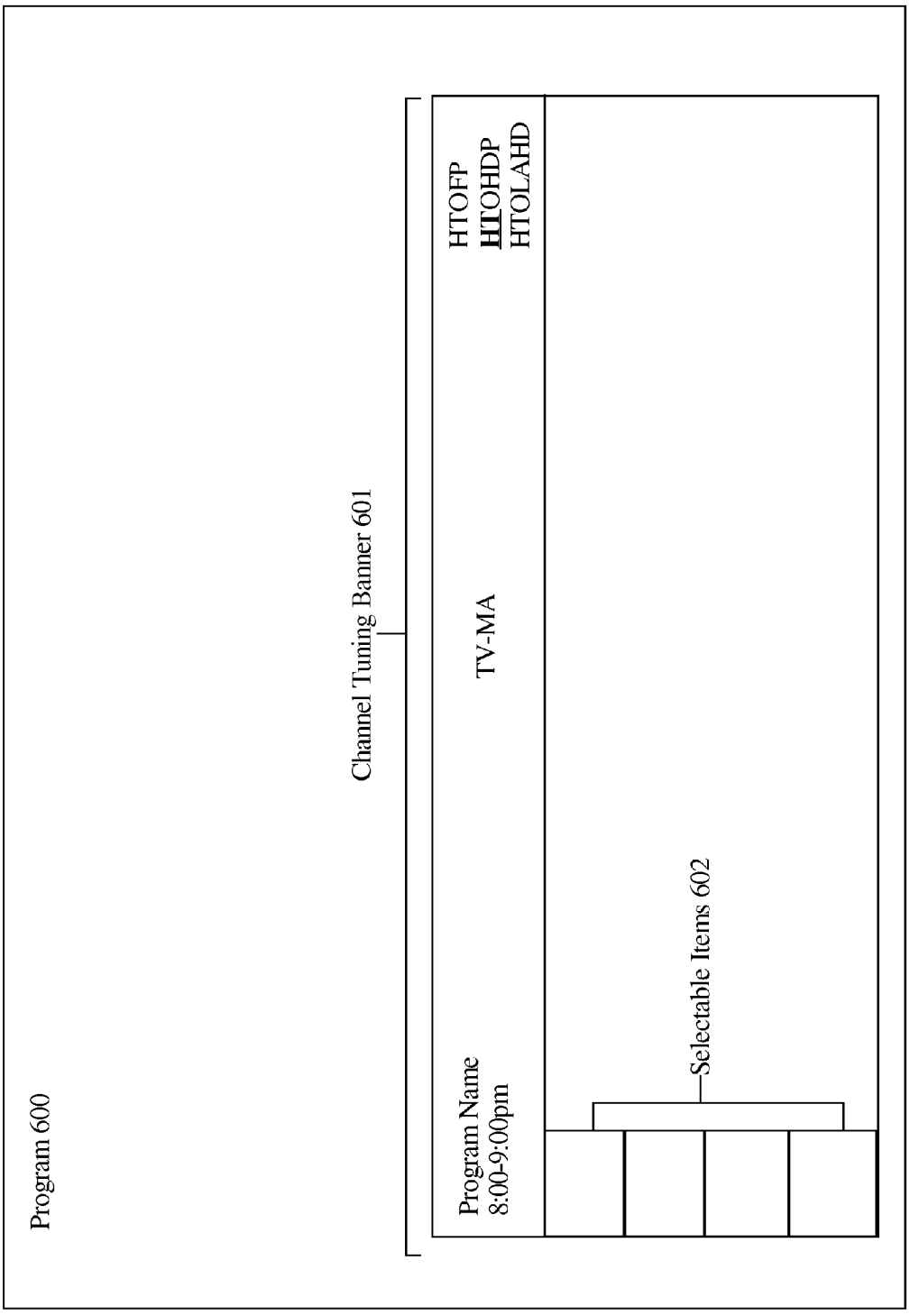
FIG. 6 illustrates an embodiment of a channel tuning banner overlaid into a presented program.

FIG. 6 illustrates an embodiment of a channel tuning banner overlaid onto a displayed program.

In FIG. 6, program 600 represents any program that is currently being presented or displayed by multimedia device 100. In some embodiments, program 600 continues to play program 600 while channel tuning banner 601 is displayed. However, in other embodiments, multimedia device 100 is able to pause the presentation of the content stream, such as by buffering or storing the stream for later playback, pausing at a frame in a buffer or stored program, causing an MPEG decoder to display a single frame, etc. As a result, such embodiments may pause program 600 while the channel tuning banner 601 is displayed. In still other embodiments, program 600 can be replaced with any other screen that may be presented by multimedia device 100. For example, program 600 may instead represent a display of EPG data 112 or any other menu screen.

In an embodiment, channel tuning banner 601 displays information for channels that multimedia device 100 determines are likely desired by the user. Multimedia device 100 may, for example, track the user's channel usage and determine which channels the user most often selects and/or records from. Thus, channel tuning banner 601 displays a list of one or more channels to which the user can select, depicted within the embodiment FIG. 6 as HTOFP, HTOHDP, and HTOLAHD. However, in other embodiments, structures other than a list may be employed by multimedia device 100 to display the channels within channel tuning banner 601, e.g., a pull-down menu, voice synthesized list, etc.

In some embodiments, channel tuning banner 601 displays information for the listed channels, such as the program currently broadcasted/streamed on each channel, the time frame during which the program will be broadcasted/streamed, and a content rating for the program. However, as an alternative, channel tuning banner 601 may display program information for only a subset of the listed channels at a time. In an embodiment, the channel(s) for which program information is displayed are visually distinguished within the list to inform the user to which channel the program information belongs. For example, the visually distinguished channel(s) may be placed in a particular position within the list (e.g., aligned with the program information, etc.), highlighted, underlined, displayed in a different color, displayed in a different font, or any other mechanism or combination of mechanisms that distinguishes from the channels for which program information is not displayed. In an embodiment, multimedia device 100 derives the program information and the list of channels from the metadata stored within EPG data 112. Thus, in other embodiments, multimedia device 100 may display within channel tuning banner 601 any type information pertaining to any channel or program that is represented within EPG data 112. Examples of such information, as mentioned above, include, but are not limited to: channel name, call sign, channel number, timelines, actors, directors, producers, reviews, content ratings, synopsis, episode number, etc.

In an embodiment, channel tuning banner 601 is displayed along with a menu of one or more selectable items 602. Selectable items 602 may perform various functions in response to being selected by a user. As one example, multimedia device 100 may contain multiple tuners, and thus is able to tune to or record content from multiple channels at a time. Thus, in an embodiment, selectable items 602 contains an option to switch which tuner's content is currently being displayed and/or an option to overlay another tuner's content onto a portion of program 600, e.g., in a picture-in-a-picture format, etc. As another example, selectable items 602 contain an option that allows users to set whether closed captioning is enabled or disabled. As another example, selectable items 602 contain an option to select an audio language. As another example, selectable items 602 contains an option to display the content presented by other multimedia devices contained within the same household or connected to the same local network. As another example, selectable items 602 contains an option that, when selected by a user, causes multimedia device 100 to display a second menu containing selectable items.

6.0 Channel Tuning Selection

Figure 7:
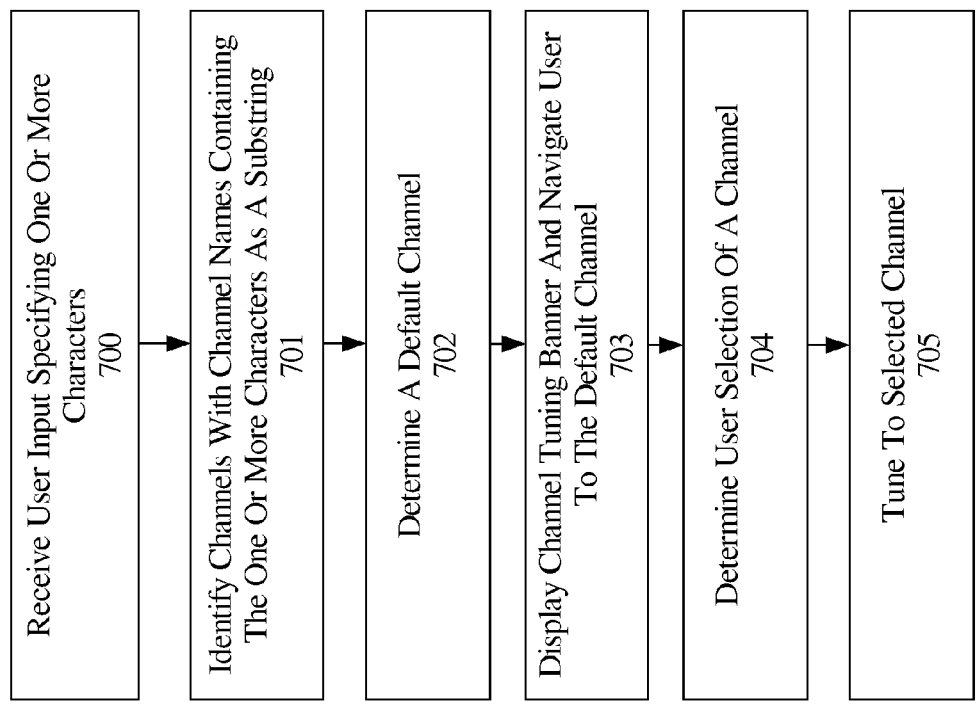
FIG. 7 illustrates a method of tuning to a channel with the assistance of a channel tuning banner in block diagram form, according to an embodiment.

FIG. 7 illustrates a flow diagram depicting a multimedia device tuning to a channel with the assistance of a channel tuning banner. In order to present clear examples, it will be assumed that multimedia device 100 tunes to a channel with the assistance of channel tuning banner 601. The techniques described in this section may be applied to tuning based on any channel feature, including, but not limited to: channel name, station call sign, channel number, etc. However, for the sake of brevity, the flow diagram of FIG. 7 illustrates channel tuning based on channel name.

At block 700, multimedia device 100 receives user input specifying one or more characters. In one embodiment, the one or more characters are alpha-numeric characters. However, other embodiments may support user input of symbols, such as grammar symbols (e.g. commas, hyphens, periods, etc.). In an embodiment, multimedia device 100 receives user input from a remote control. However, other input devices may also be employed including a keyboard, number pad, or any other device capable of submitting characters to multimedia device 100.

At block 701, multimedia device 100 identifies channels that have channel names containing the one or more characters as a substring. In some embodiments, the multimedia device 100 identifies channels associated with channel names containing the one or more characters as a particular type of substring, e.g., a prefix, postfix, infix, etc. In an embodiment, the multimedia device 100 allows users to change a system setting that controls the type of substring used to identify channels at block 701. In another embodiment, the multimedia device 100 may be configured by the factory that manufactured the multimedia device 100 or by the provider of the multimedia device 100 to perform one, some, or all types of substring matching. In an embodiment, a substring includes the case where the one or more characters match the channel name exactly or partially. In an embodiment, multimedia device 100 identifies channels by scanning the channels represented within EPG data 112 and constructs a list of channels whose names contain the one or more characters, as entered, as a substring. However, alternative data structures other than a list may also be employed for this purpose. In other embodiments, channel tuning is performed based on criteria other than channel name. Thus, the one or more characters may be compared to other metadata within EPG data 112, such as channel name or call sign, when constructing the list.

At block 702, multimedia device 100 determines a default channel. In an embodiment, multimedia device 100 determines a default channel based on a position within the list constructed at block 701. For example, multimedia device 100 may use the channel at the top of the list as the default channel. In other embodiments, multimedia device 100 sorts the list constructed at block 701 before determining an initial channel. For example, the list may be sorted based on channel name, channel number, call sign, user viewing patterns (e.g., most viewed by the user, etc.), etc.

In another embodiment, the default channel is determined based on channel usage statistics 113 for the channels identified at block 701. As a few non-limiting examples, multimedia device 100 may determine the default channel based on the frequency with which each channel has been accessed, the frequency with which each channel is accessed during a particular time period, frequency with which each channel is accessed by a particular user, recency with which each channel has been accessed, popular channels within a particular demographic, popular channels within a particular geographic area, specific defaults configured by the user (e.g. a favorites list, etc.), a recency with which each channel was played on a multimedia device, a recency with which a user has selected each channel, combinations thereof, etc. In some embodiments, the channels identified at block 701 are ordered based on one or more of the metrics discussed above. Thus, the channels may be listed based upon an increasing or decreasing likelihood that the user will tune to each channel.

At block 703, multimedia device 100 displays channel tuning banner 601 and navigates the user to the default channel. In an embodiment, channel tuning banner 601 is displayed using any of the techniques described above in "DISPLAYING THE CHANNEL TUNING BANNER". In an embodiment, the one or more channels displayed within channel tuning banner 601 are a subset of the channels identified at block 701. For example, channel tuning banner 601 may have a maximum number of channels that can be displayed simultaneously in order to maintain readability. Thus, in an embodiment, the channels displayed on channel tuning banner 601 represent a segment of the list constructed at block 701, where the segment is sized according to the maximum number of displayable channels. In an embodiment, multimedia device 100 determines the position of the segment that is displayed within the list based on the default channel. For example, the segment may be centered on the default channel. Alternatively, the segment may begin or end with the default channel.

In an embodiment, the default channel is visually distinguished from the other channels displayed within channel tuning banner 601. For example, the default channel may be displayed in a particular position within channel tuning banner 601, highlighted, underlined, displayed in a different color, displayed in a different font, or any other mechanism or combination of mechanisms that distinguishes from the default channel from other concurrently displayed channels.

In an embodiment, the channel to which multimedia device 100 is currently navigated ("navigated channel") is visually distinguished from the other channels within channel tuning banner 601. For example, the navigated channel may be displayed in a particular position within channel tuning banner 601, highlighted, underlined, displayed in a different color, displayed in a different font, or any other mechanism or combination of mechanisms that distinguishes from the default channel from other concurrently displayed channels. In an embodiment, different mechanisms are used to visually distinguish the default channel and the navigated channel. For example, one may be distinguished with highlighting where another is distinguished with underlining. Thus, in cases where the default channel is the navigated channel, that channel may be visually distinguished with both mechanisms. In an embodiment, channel tuning banner 601 displays program information only in association with the navigated channel.

In an embodiment, multimedia device 100, in response to user input, scrolls the channels displayed within channel tuning banner 601. For example, a user may employ an input device with a directional pad to indicate whether the displayed channels should be scrolled to the next channel or the previous channel. In an embodiment, when a user scrolls to the next channel, multimedia device 100 shifts the segment of the list identified at block 702 that is currently being displayed within channel tuning banner 601 (with or without wraparound). In an embodiment, as the list is scrolled, the navigated channel is switched to a next or previous channel on the list in proportion to the amount of channels that have been scrolled. For example, if displayed channels have been scrolled three channels ahead, the channel three channels ahead on the list becomes the new navigated channel. However, in other embodiments, channels may be navigated without necessarily scrolling the displayed channels. For example, multimedia device 100 may only scroll in response to a user attempting to navigate beyond the boundary of the currently displayed channels. Thus, referring to FIG. 6, a user that is currently navigated to HBOHDP and navigates "upwards" shifts the navigated channel to HBOFP. Then, should the user navigate upwards again, since the boundary has been reached, the displayed channels are scrolled. As a result, the channel added to the list due to the scrolling becomes the new navigated channel. In an embodiment, the program information and display format for the channels displayed within channel tuning banner 601 updates accordingly as the navigated channel changes.

In an embodiment, channel tuning banner 601 displays the one or more characters used to identify channels at block 701. For example, channel tuning banner 601 may display one or more of the channels where the substrings matching the one or more characters are visually distinguished from the rest of the characters. For example, the substring may be underlined, highlighted, displayed in a different color, displayed in a different format, as well as other mechanisms that visually distinguish characters. In another embodiment, the one or more characters entered by the user are displayed separately.

At block 704, multimedia device 100 determines user selection of a channel displayed in the channel banner. In an embodiment, multimedia device 100 determines user selection of a channel in response to user input. For example, the user may navigate to a channel then press a "select" button on their input device. As a result, multimedia device 100 determines that the navigated channel has been selected. In another embodiment, multimedia device 100 determines user selection based on a predetermined period of time passing since the navigated channel was last changed. Thus, should the user idle on a particular channel for longer than a threshold period of time, multimedia device 100 determines that the navigated channel has been selected. In yet another embodiment, multimedia device 100 determines that the user has selected a channel in response to a determination that only one channel has been identified at block 702. Thus, since the user input received at block 700 has narrowed down the potential channels to only one channel; multimedia device 100 assumes that the user intended to tune to that channel. In an embodiment, in such cases, multimedia device 100 foregoes block 703 and tunes directly to the channel without displaying channel tuning banner 601.

At block 705, multimedia device 100 tunes to the channel selected at block 704.

In an embodiment, blocks 700-703 may be repeated in an iterative process. For example, multimedia device 100 may receive a first one or more characters at block 700, identify channels at block 701, determine a default channel at block 702, then display channel tuner banner 501 at block 703. However, instead of selecting a channel, a user may submit a second one or more characters. As a result, multimedia device 100 identifies channels with channel names containing a substring that matches a concatenation of the first one or more characters and the second one or more characters, chooses a new default channel, and updates channel banner 501 accordingly. Thus, users may continue to add more characters, further narrowing down to the channel that the user seeks. In another embodiment, multimedia device 100 allows users to "backspace" or otherwise modify characters that have previously been received. As a result, should the user make a mistake in entering characters, the user can erase or change characters to correct the mistake.

In an embodiment, if at block 702 multimedia device 100 determines that no channels match the one or more characters, an indication that no matching channels have been found is displayed. As one example, an error box or message may be displayed. As another example, multimedia device 100 may cause the screen to shake. As yet another example, multimedia device 100 may present the notification audibly. In addition, multimedia device 100 may ignore the new input, allowing the user to submit different characters. In other embodiments, multimedia device 100 clears the current filtering criteria, potentially with a visible/audible notification as described above. In another embodiment, multimedia device 100 employs automatic techniques to guess the channels to which the user had intended tune. As one example, multimedia device 100 may employ spelling detection and correction techniques, such as approximate string matching, by using the channel names contained within EPG data 112 as the dictionary. As another example, multimedia device 100 may consult channel usage statistics 113 to locate commonly accessed channels and perform approximate string or other comparison techniques between the currently entered characters and the names of the commonly accessed channels. As a result, multimedia device 100 may identify channels at block 702 based on the top N closest matching channels or channels within a threshold distance of the presently entered characters.

7.0 Custom Shortcuts

In an embodiment, multimedia device 100 allows users to set custom shortcuts to access channels. For example, multimedia device 100 may maintain shortcut metadata that maps between custom shortcuts and particular channels, e.g., a lookup table, database association, etc. Thus, in response to receiving user input specifying a relationship between a custom shortcut and a channel, multimedia device 100 updates the shortcut metadata to indicate the relationship. In one embodiment, custom shortcuts are numbers. In other embodiments, customer shortcuts are alphanumeric characters. In still other embodiments, custom shortcuts also include symbols, such as grammar symbols. In an embodiment, multimedia device 100 may limit the amount of shortcuts that a user can define to a predetermined amount. In an embodiment, a user may notify multimedia device 100 of a shortcut via a user interface screen that allows the user to designate a shortcut and channel to be associated with the shortcut. In an embodiment, a user may designate a shortcut to be associated with a channel that the user is currently viewing, e.g., via a pop-up menu that is initiated by pressing/selecting a button on a remote control device.

In an embodiment, multimedia device 100 tunes to a channel in response to receiving user input specifying a custom shortcut associated with that channel. In an embodiment, while multimedia device 100 displays a program or a menu screen, a user submits input specifying the custom shortcut. In response, multimedia device 100 checks the shortcut metadata to determine the channel to which the custom shortcut is mapped. Once the channel has been determined, multimedia device 100 tunes to that channel. For example, a user may associate "Channel 28" with the character "1". Thus, should the user enter "1" as input, multimedia device 100 automatically tunes to "Channel 28".

In an embodiment, to differentiate between user input specifying a custom shortcut and user input specifying a channel feature, such as may be used for the techniques described in "CHANNEL TUNING SELECTION", users submit a special input prior to submitting the characters. The special input informs the multimedia device 100 that a shortcut is being entered. For example, the user's remote control may contain a "shortcut" button, that when pressed, informs multimedia device 100 that a shortcut is being entered. Thus, according to one embodiment, when a user enters characters without pushing the "shortcut" button first, multimedia device 100 tunes according to the techniques described in "CHANNEL TUNING SELECTION". However, should the user first push the "shortcut button", the characters are assumed to be a custom shortcut. Thus, multimedia device 100 maps the characters to a channel using the shortcut metadata, and tunes to the associated channel.

In an embodiment, the techniques described in "CHANNEL TUNING SELECTION" are employed using the custom shortcuts as the feature used to identify channels at block 702. Thus, as the user enters a custom shortcut, multimedia device 100 displays a channel tuning banner 601 displaying information for the channels whose custom shortcuts have a substring that matches the currently submitted characters.

8.0 Remote Control Input Techniques

In some embodiments, users submit input specifying characters using an alpha-numeric remote, a remote that includes an alpha-numeric keyboard. However, many remotes only allow users to submit numbers. As a result, users who do not have access to an alpha-numeric remote may still want access to features that potentially make use of non-numeric characters, such as filtering EPG data 112, tuning to a channel by channel name, etc.

In one embodiment, each number on a remote is associated with one or more characters. By submitting the number more than once, multimedia device 100 interprets the input as scrolling through the associated characters. For example, "1" may be associated with the characters "ABC". Upon initially submitting "1", multimedia device 100 interprets "1" as the character submitted. However if within a threshold period of time the user submits "1" again, multimedia device instead interprets the input as the character "A". By submitting "1" yet again within the threshold period of time from the last submission, multimedia device 100 instead interprets the input as the character "B". Scrolling next to "C", then back around again to "1". After the threshold period of time has passed since the last input, or a number other than "1" has been submitted, multimedia device 100 uses the current interpretation as the user input. As a result, users that do not have access to an alpha-numeric remote are still able to take advantage of features that use non-numeric characters as input.

In another embodiment, users who wish to enter non-numeric characters first submit a special input, such as a "function" button on their remote, which informs the multimedia device to interpret the input as a non-numeric character. As a result, users scroll through the characters associated with a number without also scrolling through the number. Using the above example, submitting "1" will automatically be interpreted as "A" with further submissions rotating the input between "A", "B", and "C".

In yet another embodiment, instead of submitting the same number multiple times to scroll through the characters associated with that number, multimedia device 100 interprets submitting the number as a logical disjunction of the characters and/or the number. For example, when a user submits a "1", multimedia device 100 when performing tuning or filtering interprets the "1" as the logical disjunction of "1", "A", "B", and "C". Thus, multimedia device 100 identifies channels with channel numbers (or other features) containing a substring that matches any of "1", "A", "B" or "C". Then, should the user submit another number, for example "2", multimedia device 100 instead identifies channels with channel names where the first character is any of "1", "A", "B", or "C" and the second character is any of "2", "D", "E", or "F". As a result, even if the user had intended to submit the characters "AF", the number of unintended channels that are identified is still likely limited to a fairly narrow range. Thus, although this technique may result in additional channels being identified, some users may find this technique more convenient due to the fewer times that user input needs to be submitted.

In an embodiment, multimedia device 100 provides a menu option, that when selected by the user, allows the user to set which techniques will be employed by multimedia device 100 to interpret character submissions.

9.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
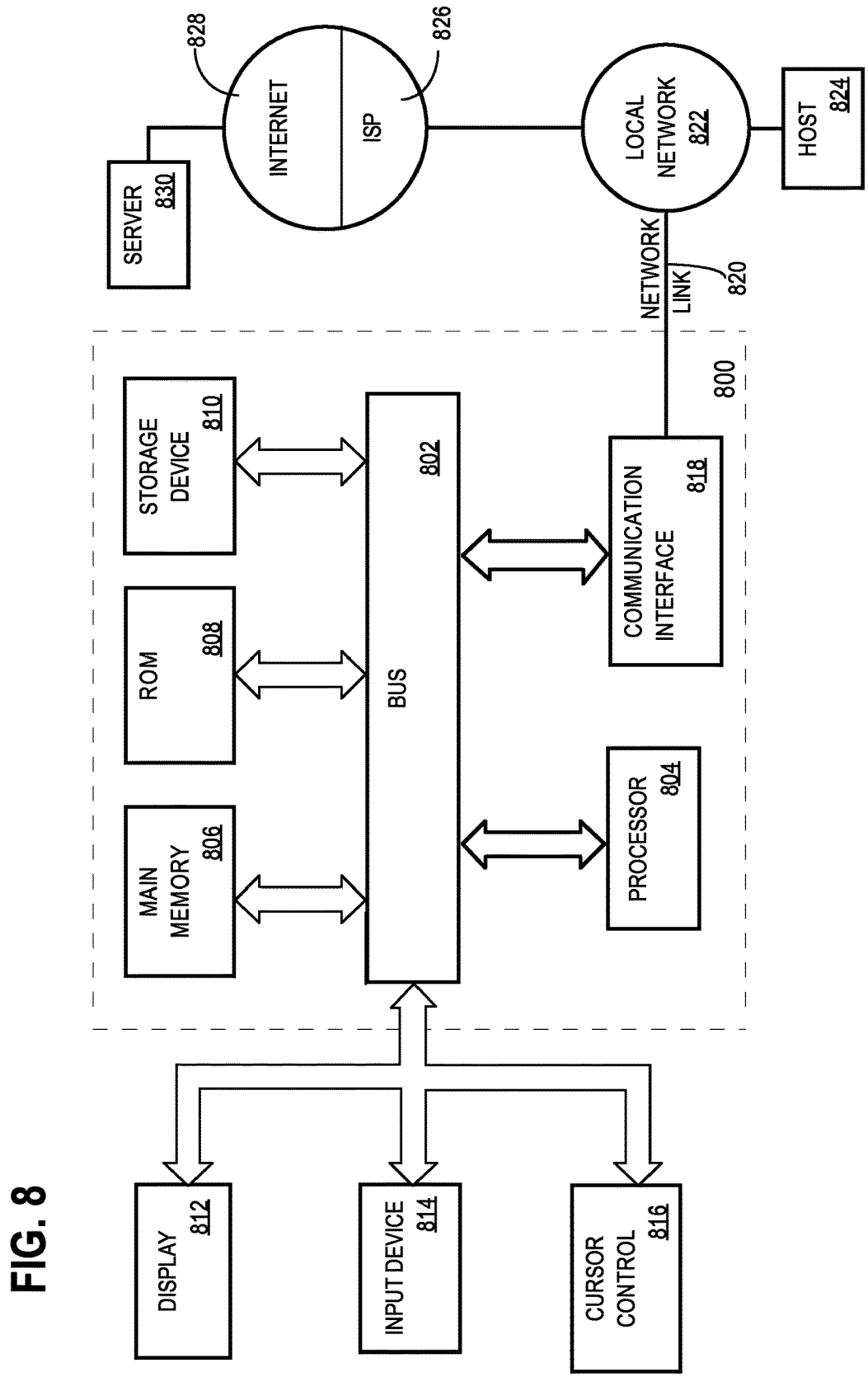
FIG. 8 illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), LCD monitor, LED monitor, etc., for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
receiving, by a multimedia device, an initial character input in response to a user pressing a key on a user input device;

selecting, based on the initial character input, a single channel filtering method from any of a first channel filtering method for filtering a plurality of channels by channel number, and a second channel filtering method for filtering the plurality of channels by channel name, each channel in the plurality of channels being associated with a unique channel name for identifying a content provider for that channel and a unique channel number of the multimedia device to use to tune the multimedia device to that channel;

receiving, by the multimedia device, a second character input subsequent to the initial character input within a time threshold in response to user repeatedly pressing the key a second time, wherein the second character input is non-numeric character associated with the key;

in response to receiving the second character input subsequent to the initial character input within the time threshold, selecting the second channel filtering method for filtering the plurality of channels by channel name;

identifying one or more channels by identifying one or more channel names that contain the initial character input and second character input in accordance with the second filtering method;

causing the one or more identified channel names of the one or more identified channels to be displayed on the multimedia device, wherein the one or more identified channel names are displayed in priority order based on the second character input including in prefix and infix of the one or more identified channel names; and causing the multimedia device to tune to a particular channel associated with a particular channel name of the one or more identified channel names, of the one or more identified channels;

wherein in response to receiving a special input before receiving character input, the multimedia device automatically interprets the character input as non-numeric characters associated with a number without scrolling through the number.

2. The method of claim 1, wherein the initial character input comprises a plurality of one or more characters.

3. The method of claim 1, wherein the one or more identified channel names contains a visually distinguished channel name.

4. The method of claim 3, wherein the visually distinguished channel name is selected from the one or more channel names based on at least one of: channel usage metrics for each channel associated with the one or more channel names, user defined parameters, and default parameters.

5. The method of claim 4, wherein the channel usage metrics for each channel includes at least one of:
 a first frequency with which each channel was selected within a geographic area,
 a second frequency with which each channel was selected within a particular demographic,
 a third frequency with which each channel was selected through the multimedia device,
 a fourth frequency with which each channel was selected during a particular time frame,
 a fifth frequency with which the user has selected each channel,
 a first recency with which each channel was played on the multimedia device, and
 a second recency with which the user has selected each channel.

6. The method of claim 4, wherein the visually distinguished channel name is displayed concurrently with particular information related to the channel associated with the visually distinguished channel name.

7. The method of claim 6, wherein the particular information includes at least one of:
 a call sign,
 the channel number associated with the channel associated with the visually distinguished channel name,
 a program name for a program playing on the channel associated with the visually distinguished channel name, a content rating for the program, and
 a time period during which the program is playing on the channel associated with the visually distinguished channel name.

8. The method of claim 3, wherein the initial character input of the visually distinguished channel name is displayed in a manner that is visually distinguished from a remainder of characters of the visually distinguished channel name.

9. The method of claim 1, wherein the one or more identified channel names is displayed concurrently with a menu including at least one of:
 a first selectable item that when selected causes the multimedia device to display content received by a particular tuner,
 a second selectable item that when selected causes closed caption to be enabled or disabled,
 a third selectable item that when selected causes a language setting to change,
 a fourth selectable item that when selected causes the multimedia device to display one or more programs playing on other multimedia devices on a same local network with the multimedia device, and
 a fifth selectable item that when selected causes the multimedia device to display a second menu of one or more additional selectable items.

10. The method of claim 1, wherein causing the multimedia device to tune to the particular channel associated with the particular channel name occurs in response to at least one of:
 receiving user input selecting the particular channel name,
 a determination that the one or more channel names contain only the particular channel name, and
 a determination that a threshold period of time has passed without a user navigating away from the particular channel name.

11. A non-transitory computer-readable medium storing instructions, which when executed by one or more processors causes the one or more processors to perform:
 receiving, by a multimedia device, an initial character input comprising an alphanumeric character in response to a user pressing a key on a user input device;
 selecting, based on the initial character input, a single channel filtering method from any of a first channel filtering method for filtering a plurality of channels by channel number, and a second channel filtering method for filtering the plurality of channels by channel name, each channel in the plurality of channels being associated with a unique channel name for identifying a content provider for that channel and a unique channel number of the multimedia device to use to tune the multimedia device to that channel;
 receiving, by the multimedia device, a second character input subsequent to the initial character input within a time threshold in response to user repeatedly pressing the key a second time, wherein the second character input is non-numeric character associated with the key;
 in response to receiving the second character input subsequent to the initial character input within the time threshold, selecting the second channel filtering method for filtering the plurality of channels by channel name;

identifying one or more channels by identifying one or more channel names that contain the initial character input and second character input in accordance with the second filtering method;

causing the one or more identified channel names of the one or more identified channels to be displayed on the multimedia device, wherein the one or more identified channel names are displayed in priority order based on the second character input including in prefix and infix of the one or more identified channel names;

causing the multimedia device to tune to a particular channel associated with a particular channel name of the one or more channel names, of the one or more identified channels;

wherein in response to receiving a special input before receiving character input, the multimedia device automatically interprets the character input as non-numeric characters associated with a number without scrolling through the number.

12. The non-transitory computer-readable medium of claim 11, wherein initial character input comprises a plurality of one or more characters.

13. The non-transitory computer-readable medium of claim 11, wherein the one or more identified channel names contains a visually distinguished channel name.

14. The non-transitory computer-readable medium of claim 13, wherein the visually distinguished channel name is selected from the one or more channel names based on at least one of: channel usage metrics for each channel associated with the one or more channel names, user defined parameters, and default parameters.

15. The non-transitory computer-readable medium of claim 14, wherein the channel usage metrics for each channel includes at least one of:
a first frequency with which each channel was selected within a geographic area,
a second frequency with which each channel was selected within a particular demographic,
a third frequency with which each channel was selected through the multimedia device,
a fourth frequency with which each channel was selected during a particular time frame,
a fifth frequency with which the user has selected each channel,
a first recency with which each channel was played on the multimedia device, and
a second recency with which the user has selected each channel.

16. The non-transitory computer-readable medium of claim 14, wherein the visually distinguished channel name is displayed concurrently with particular information related to the channel associated with the visually distinguished channel name.

17. The non-transitory computer-readable medium of claim 16, wherein the particular information includes at least one of:
a call sign,
the channel number associated with the channel associated with the visually distinguished channel name,
a program name for a program playing on the channel associated with the visually distinguished channel name,
a content rating for the program, and
a time period during which the program is playing on the channel associated with the visually distinguished channel name.

18. The non-transitory computer-readable medium of claim 13, wherein the initial character input of the visually distinguished channel name is displayed in a manner that is visually distinguished from a remainder of characters of the visually distinguished channel name.

19. The non-transitory computer-readable medium of claim 11, wherein the one or more identified channel names is displayed concurrently with a menu including at least of:
a first selectable item that when selected causes the multimedia device to display content received by a particular tuner,
a second selectable item that when selected causes closed caption to be enabled or disabled,
a third selectable item that when selected causes a language setting to change,
a fourth selectable item that when selected causes the multimedia device to display one or more programs playing on other multimedia devices on a same local network with the multimedia device, and
a fifth selectable item that when selected causes the multimedia device to display a second menu of one or more additional selectable items.

20. The non-transitory computer-readable medium of claim 11, wherein causing the multimedia device to tune to the particular channel associated with the particular channel name occurs in response to at least one of receiving user input selecting the particular channel name,
a determination that the one or more channel names contain only the particular channel name, and
a determination that a threshold period of time has passed without a user navigating away from the particular channel name.

21. An apparatus comprising:
a subsystem, implemented at least partially in hardware, that receives an initial character input comprising an alphanumeric character in response to a user pressing a key on a user input device;
a subsystem, implemented at least partially in hardware and based on the initial character input, selects a single channel filtering method from any of a first channel filtering method for filtering a plurality of channels by channel number, and a second channel filtering method for filtering the plurality of channels by channel name, each channel in the plurality of channels being associated with a unique channel name for identifying a content provider for that channel and a unique channel number of a multimedia device to use to tune the multimedia device to that channel;
a subsystem, implemented at least partially in hardware, receives a second character input subsequent to the initial character input within a time threshold in response to user repeatedly pressing the key a second time, wherein the second character input is non-numeric character associated with the key;
a subsystem, implemented at least partially in hardware, that in response to receiving the second character input subsequent to the initial character input within the time threshold and using the initial character input, selects the second channel filtering method for filtering the plurality of channels by channel name, identifies one or more channels by identifying one or more channel names that contain the initial character input and second character input in accordance with the second filtering method;

a subsystem, implemented at least partially in hardware, that causes the one or more identified channel names of the one or more identified channels to be displayed on the multimedia device, wherein the one or more identified channel names are displayed in priority order based on the second character input including in prefix and infix of the one or more identified channel names;

wherein in response to receiving a special input before receiving character input, the multimedia device automatically interprets the character input as non-numeric characters associated with a number without scrolling through the number;

a subsystem, implemented at least partially in hardware, that causes the multimedia device to tune to a particular channel associated with a particular channel name of the one or more identified channel names of the one or more identified channels.

22. The apparatus of claim 21, wherein the initial character input comprises a plurality of one or more characters.

23. The apparatus of claim 22, wherein the one or more identified channel names contains a visually distinguished channel name.

24. The apparatus of claim 23, wherein the visually distinguished channel name is selected from the one or more channel names based on at least of: channel usage metrics for each channel associated with the one or more channel names, user defined parameters, and default parameters.

25. The apparatus of claim 24, wherein the channel usage metrics for each channel includes at least one of:
a first frequency with which each channel was selected within a geographic area,
a second frequency with which each channel was selected within a particular demographic,
a third frequency with which each channel was selected through the multimedia device,
a fourth frequency with which each channel was selected during a particular time frame,
a fifth frequency with which the user has selected each channel,
a first recency with which each channel was played on the multimedia device, and
a second recency with which the user has selected each channel.

26. The apparatus of claim 24, wherein the visually distinguished channel name is displayed concurrently with particular information related to the channel associated with the visually distinguished channel name.

27. The apparatus of claim 26, wherein the particular information includes at least one of:
a call sign,
a channel number associated with the channel associated with the visually distinguished channel name,
a program name for a program playing on the channel associated with the visually distinguished channel name,
a content rating for the program, and
a time period during which the program is playing on the channel associated with the visually distinguished channel name.

28. The apparatus of claim 23, wherein the initial character input of the visually distinguished channel name is displayed in a manner that is visually distinguished from a remainder of characters of the visually distinguished channel name.

29. The apparatus of claim 21, wherein the one or more identified channel names is displayed concurrently with a menu including at least one of:
a selectable item that when selected causes the multimedia device to display content received by a particular tuner,
a selectable item that when selected causes closed caption to be enabled or disabled,
a selectable item that when selected causes a language setting to change,
a selectable item that when selected causes the multimedia device to display one or more programs playing on other multimedia devices on a same local network with the multimedia device, and
a selectable item that when selected causes the multimedia device to display a second menu of one or more additional selectable items.

30. The apparatus of claim 21, wherein the tuning subsystem causes the multimedia device to tune to the particular channel associated with the particular channel name in response to at least one of:
receiving user input selecting the particular channel name,
a determination that the one or more channel names contain only the particular channel name,
and a determination that a threshold period of time has passed without a user navigating away from the particular channel name.

* * * * *